United States Patent
Ryder

(10) Patent No.: US 6,862,837 B2
(45) Date of Patent: Mar. 8, 2005

(54) FISHING ACCESSORY THAT CAN BE A FLOAT OR A SINKER

(76) Inventor: Lance Lewis Ryder, 43 Stace Road, Ayr, Queensland (AU), 4807

( * ) Notice: Subject to any disclaimer, the term of this patent is extended or adjusted under 35 U.S.C. 154(b) by 0 days.

(21) Appl. No.: 10/370,626

(22) Filed: Feb. 24, 2003

(65) Prior Publication Data

US 2003/0159333 A1 Aug. 28, 2003

(30) Foreign Application Priority Data

Feb. 27, 2002 (AU) ............................................. 18722/02

(51) Int. Cl.⁷ ............................................. A01K 95/00
(52) U.S. Cl. ........................................ 43/44.87; 43/44.9
(58) Field of Search ............................ 43/44.87, 43.14, 43/44.9, 44.91

(56) References Cited

U.S. PATENT DOCUMENTS

| | | | | |
|---|---|---|---|---|
| 3,736,690 A | * | 6/1973 | Witkowski | 43/43.14 |
| 4,202,128 A | * | 5/1980 | Hill et al. | 43/43.14 |
| 4,696,125 A | * | 9/1987 | Rayburn | 43/43.14 |
| 5,404,668 A | * | 4/1995 | Christensen | 43/44.87 |
| 5,412,902 A | * | 5/1995 | Hicks | 43/44.87 |
| 5,970,649 A | * | 10/1999 | Alain et al. | 43/43.14 |

FOREIGN PATENT DOCUMENTS

| | | |
|---|---|---|
| AU | 286106 | 10/1966 |
| AU | 53881/79 | 7/1980 |
| JP | 09028255 A | 2/1997 |
| JP | 10225253 A | 8/1998 |
| JP | 2000014295 A | 1/2000 |
| JP | 2000139306 A | 5/2000 |
| JP | 2001061387 A | 3/2001 |
| WO | WO 96/20591 | 7/1996 |

\* cited by examiner

*Primary Examiner*—Peter M. Poon
*Assistant Examiner*—Bethany L. Griles
(74) *Attorney, Agent, or Firm*—Hoffman Wasson & Gitler PC

(57) ABSTRACT

A fishing line accessory comprises a body having an internal compartment which can be sealed with a cap. The compartment, when empty allows the fishing line accessory to function as a float. The compartment can be filled with sand to allow the same accessory to function as a sinker. The compartment can be partially filled with sand/water to allow the degree of buoyancy of the accessory to be varied in an almost unlimited manner.

10 Claims, 3 Drawing Sheets

FISHING ACCESSORY THAT CAN BE A FLOAT OR A SINKER

FIELD OF THE INVENTION

This invention is directed to a fishing accessory that can function both as a float for a fishing line and which can invert to become a sinker for a fishing line. Thus, it is no longer necessary to purchase floats and sinkers separately.

BACKGROUND ART

Fishing floats and fishing sinkers are typically separate items but both are required for fishing. The fishing floats function to maintain a fish hook usually in an upper part of the water, while the fishing sinker functions in the opposite manner to maintain a fish hook in a lower part of the water. It is also known to have a fishing line containing both one or more floats and one or more sinkers.

One disadvantage with current arrangements is that it is difficult to adjust the overall buoyancy of the fishing line/hook to suit the particular conditions. For instance, a fishing float will have a particular buoyancy and it may be necessary to string a number of floats together to provide the desired level of buoyancy. This can be quite difficult and time-consuming. Sometimes it is also necessary to adjust the weight of the tackle and this is done by adding sinkers of different weights, or by stringing a number of sinkers together. Sometimes it is necessary to have both floats and sinkers on the same line and it can be quite time-consuming to adjust the line weight to suit the particular conditions. These particular conditions can vary depending on the type of hook, the line size, the type of bait, whether the line is being trailed behind a boat, or cast from a shore and the like.

Therefore, it would be an advantage if a single fishing accessory could be provided which could have an easily adjustable buoyancy and which can function as a float, a sinker, or something there between.

OBJECT OF THE INVENTION

It is an object of the invention to provide a fishing accessory that may at least partially overcome the above-mentioned disadvantages or provide the public with a useful or commercial choice.

In one form, the invention resides in a fishing line accessory that can function as a float and as a sinker, the fishing line accessory comprising:

a body, which has at least one hollow compartment, the body being buoyant when the hollow compartment is empty, an outlet communicating with the at least one hollow compartment and the exterior of the body, a closure which closes the outlet but which can adopt an open position, the compartment and outlet allowing a solid or liquid to be added to, or removed from, the compartment to adjust the buoyancy of the body, the compartment having a larger internal volume adjacent the outlet and a smaller internal volume spaced from the outlet , such that the accessory can adopt a floating position where the accessory is above the fishing line, and a sinker position where the accessory is inverted, and attachment means to allow the accessory to be attached to a fishing line.

In this manner, the hollow compartment, when empty, allows the accessory to be used as a float. The compartment can be partially or fully filled with a solid such as sand to convert the accessory into a sinker. Moreover, the compartment can also be partially or fully filled with a liquid such as water to allow the accessory to be neither fully buoyant nor fully weighted. Thus, by adding or removing material in the compartment, the level of buoyancy of the accessory can easily be "tuned" to the required conditions. Thus it is no longer necessary to add additional sinkers, floats and the like to achieve the required buoyancy.

The body may have any suitable shape that will allow it to be used as a float or a sinker. The body may be spherical, oval, teardrop, cubic shape, or have any other irregular shape. The size of the body can vary to suit but it is envisaged that a size that is extremely large may not be suitable for use as a fishing float or sinker. Typically, the body will have a overall length of between 20–200 mm.

The body can be made of various materials but it is envisaged that corrosion resistant materials would be of greatest benefit and these would include plastics, wood, corrosion resistance metals such as brass stainless steel, aluminium and the like.

The thickness of the body will depend on the material but the is body should be made of material which is sufficiently to provide a degree of robustness to the body and to allow it to be submerged underwater and to take the normal wear and tear which occurs during fishing.

The body may be substantially rigid and therefore may comprise a substantially rigid plastic, or a metal. However, the body may also be deformable or flexible and therefore the body material may comprise a partially flexible material.

The body may be provided with external members. These may include stabilising fins, drag reducing devices, attachments for lures or other fish attracting devices etc.

The body contains at least one hollow compartment. In one form, the body can be substantially hollow to allow the compartment to be as large as possible thereby allowing the buoyancy of the accessory to be adjusted as much as possible. Alternatively, the at least one hollow compartment may comprise only part of the body and the remainder of the body may be solid and may comprise the normal body material, or may comprise a different type of solid which has been added to the normal body material. For instance, the normal body material may be plastics and part of the inside of the body may comprise a polystyrene, a wood (such as cork), a gel material etc.

The body may contain more than one internal compartment. For instance, a plurality of compartment may be provided. Each compartment may contain its own outlet or may be in communication with some or all of the other compartments. This may allow the accessory to be better "tuned" to the use conditions and may allow one compartment to be at least partially filled with, say, sand while the other compartment can be at least partially filled with, say, water, which may provide a beneficial result.

The additional compartment could also be used to accommodate a fish attractant such as burly, and this could be a slow release fish attractant. The advantage of this is that the fish attractant is proximal to the hook. The compartment may be only partially sealed to allow the burly to pass into the surrounding water.

The compartment is associated with an outlet. The outlet communicates with the outside of the body thereby allowing the compartment to be filled/emptied with a flowable material such as sand, water etc. The outlet should have a convenient size to allow material to be added to or removed from the compartment without excessive effort. Therefore, the outlet typically has an outlet size of between 5–30 mm, although this can vary.

The outlet can be closed off to trap air in the compartment (if the compartment is empty), or any solid/liquid material in the compartment. Typically, a closure such as a cap is provided. The cap can be as simple as a stopper that can be pushed into the outlet. Alternatively, the cap may comprise a screw on cap, a flip up cap, and the like. An advantage in having a screw on cap is that if the cap is only loosely screwed on, water can pass into the housing when the device is in the water, and air can pass from the housing. Thus, this can allow the accessory to slowly lose its buoyancy and convert from a float to something heavier. A practical application would allow the device to initially function as a float and therefore to carry a fishing line and hook downstream or with the tide, after which the float slowly increases in weight.

Of course, other methods by which water can slowly seep into the internal compartment are also envisaged and these may include valves and the like.

The accessory is provided with an attachment means to allow it to be attached to a fishing line or to a fishing line attachment. The attachment means in a simple form may comprise an eyelet through which the fishing line can pass. Other forms of attachments are also envisaged. For instance, in a slightly more complicated form, the attachment means may comprise a passageway extending through the body. If the passageway extends through part of the body which does not include the internal compartment, the fishing line can be simply threaded through the passageway. If the passageway extends through part of the internal compartment, the passageway may need to be separated from the internal compartment and in a simple form this can be done by providing a separate tube passing through the internal compartment and through which the fishing line can pass.

The body may be provided with at least one rib or projection which can run along the length of the body or at least partially along the body, typically from the attachment means to the closure. Typically, a plurality of ribs or projections are provided and each rib or projection may have a width of between 1–5 mm and a depth of between 1–5 mm although this can vary. The rib or projection may be hollow or partially hollow and can accommodate an attractant such as a fish attractant. Thus, the rib or projection may be provided with some form of inlet to allow the attractant to be placed into the rib or projection and is preferably provided with one or more outlets to allow the fish attractant to be slowly released. In this manner, the attractant is proximal to the body. Alternatively, or in addition to the above, the rib or projection may be solid and may be provided with attachment means to allow various attachments to be attached to the body such as drag reducing devices, stabilizing fins and the like. The attachment means may be as simple as an opening in the rib to allow a device to be threaded through the opening, or may be more complicated and may comprise a clip, hook and the like.

BRIEF DESCRIPTION OF THE DRAWINGS

Embodiments of the invention will be described with reference to the following drawings in which.

BEST MODE

Figure 1:
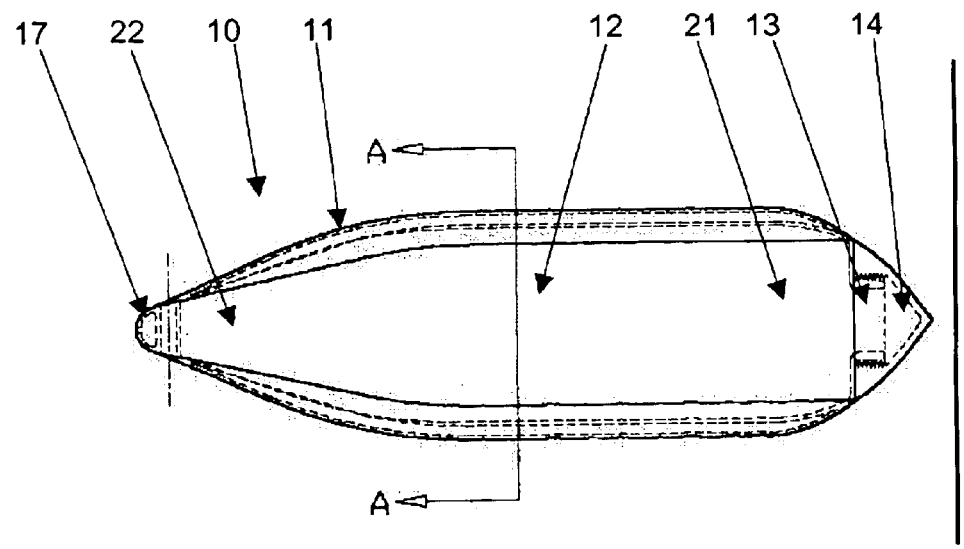
FIG. 1. Illustrates a plan view of the accessory.
Figure 2:
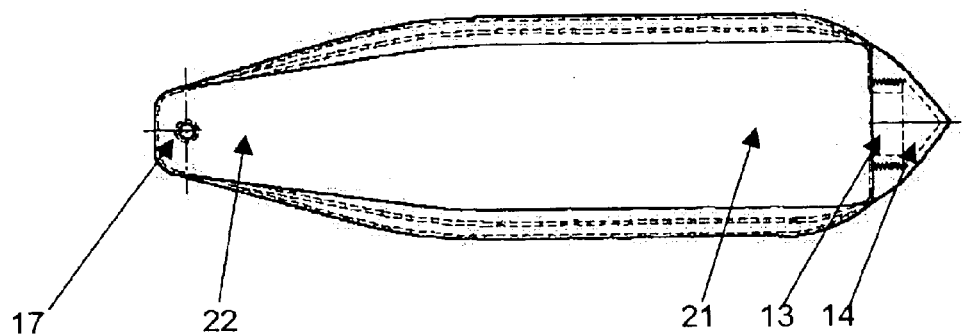
FIG. 2. Illustrates a side view of the accessory.

Referring initially to FIG. 1, there is illustrated a fishing line accessory 10 which can be used both as a float or as a sinker. The accessory 10 comprises a body 11 which is substantially hollow and therefore has an internal hollow compartment 12. The compartment 12 has an outlet 13 which is sufficiently large to allow sand or water to be added to the compartment or removed from the compartment. In the particular embodiment, accessory 10 can have a length of between 50–200 mm, and a width of between 20–100 mm, although this can vary to suit.

Figure 4:
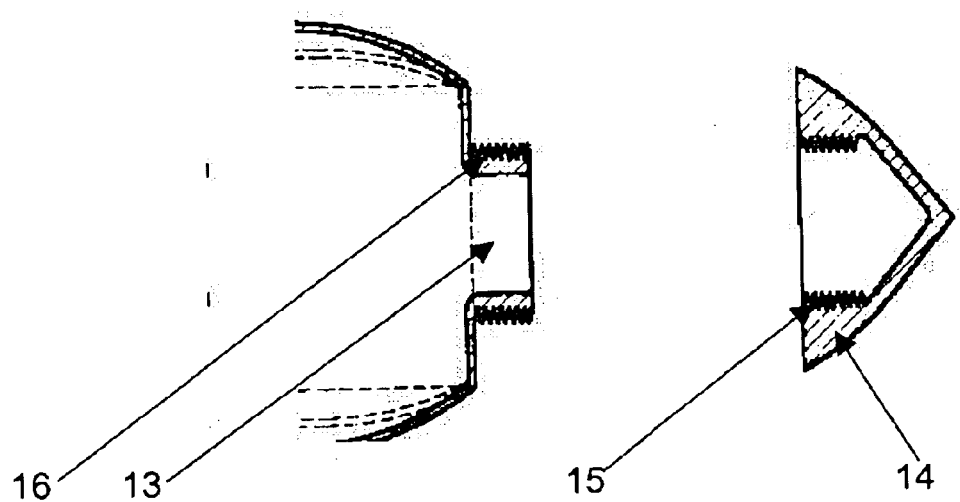
FIG. 4. Illustrates a close-up view of the closure.

Outlet 13 can be sealed with a cap 14 (see FIG. 4). Cap 14 has a threaded inner end 15 which can threadingly engage with threads 16 extending around the periphery of outlet 13 to allow cap 14 to be threadingly attached to body 11. Cap 14 has an outer configuration to provide a streamlined effect when the cap is attached to the front of body 11.

At the other end of the body is an attachment means in the form of a small eyelet 17 through which the fishing line can pass to attach the accessory to the fishing line. Of course, other types of attachments are envisaged.

Figure 5:
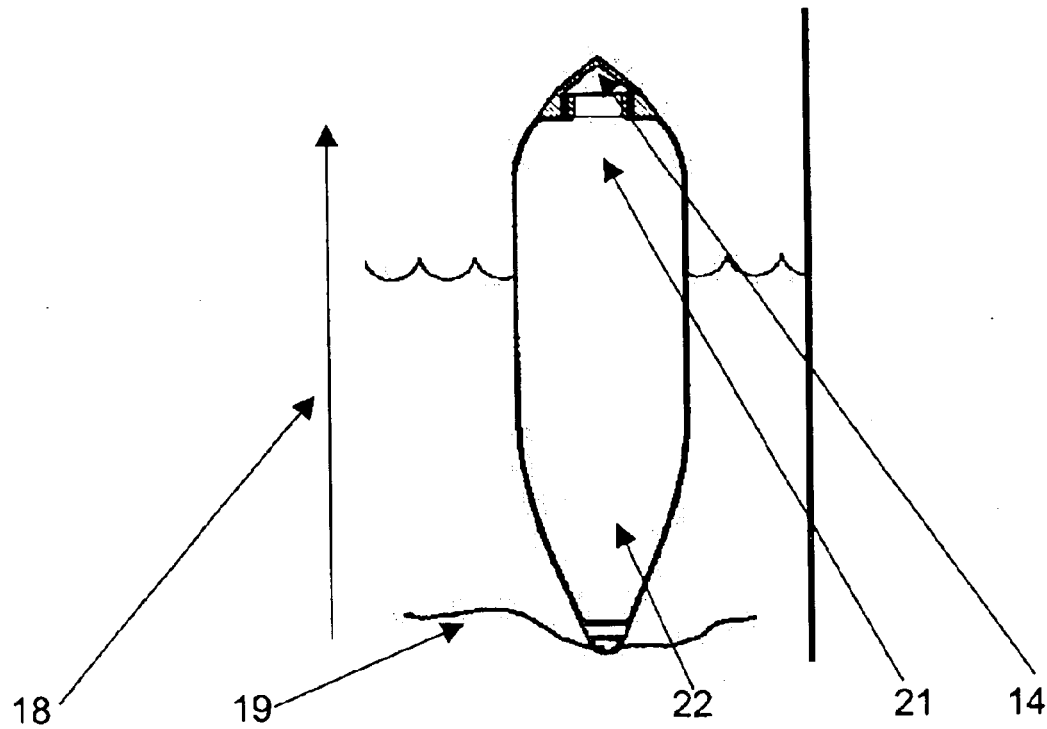
FIG. 5. Illustrates the accessory in a "float" position.

Body 10 is formed from plastic and itself has a relatively neutral buoyancy. If the internal compartment 12 is empty, and cap 14 is attached to the body, the accessory acts as a float, this being illustrated in FIG. 5 showing the accessory providing an upward force indicated by arrow 18 to fishing line 19.

Figure 6:
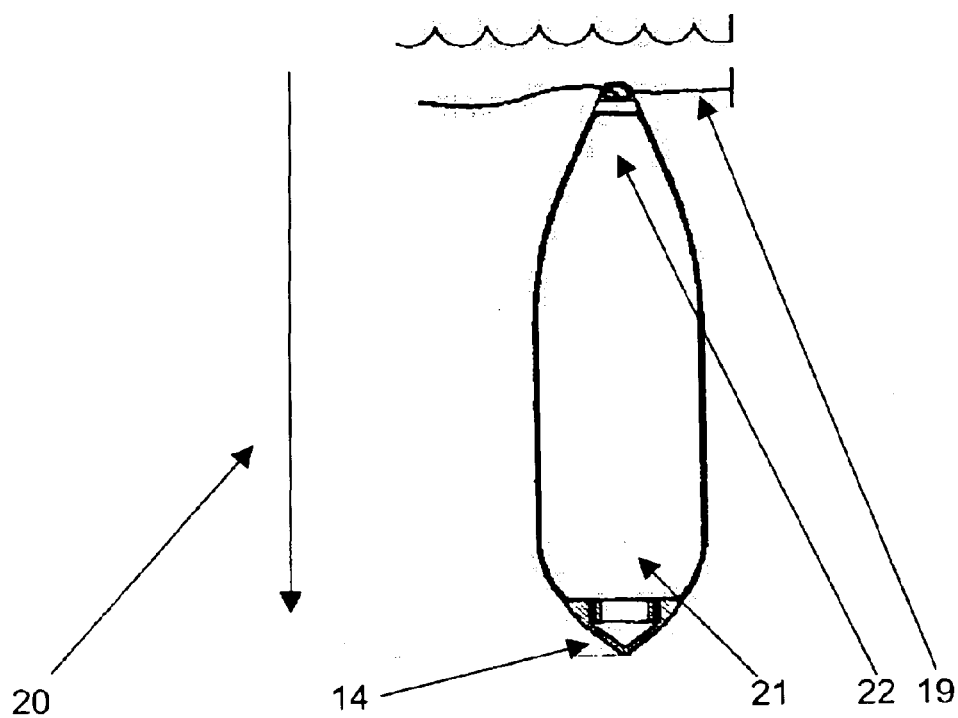
FIG. 6. Illustrates the accessory in a "sinker" position.
Figure 7:
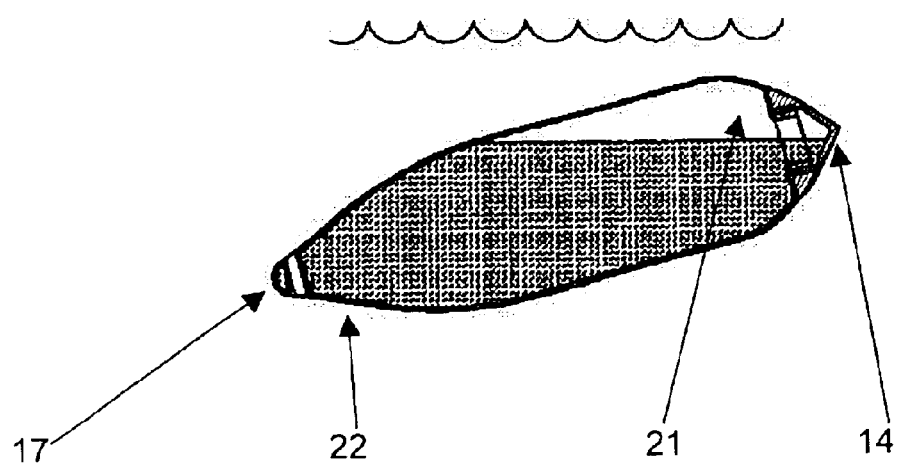
FIG. 7. Illustrates the accessory in a "neutral buoyancy" position.

However, internal compartment 12 can also be filled with sand 21 and cap 14 can be attached which will result in the accessory having a negative buoyancy and therefore acting as a sinker, this being illustrated in FIG. 6 showing the accessory providing a downward force indicated by arrow 20 to fishing line 19. Of course, the accessory can be partially filled with either sand or water to result in the accessory having a neutral buoyancy, this being illustrated in FIG. 7.

Internal compartment 12 has a larger volume 21 adjacent outlet 13, and a smaller internal volume 22 at the trail end of the body which in this particular embodiment is adjacent eyelet 17. This particular configuration provide substantial and significant benefits to the use of the attachment as a float and a sinker, as the shape facilitates the body adopting the floating position (see FIG. 5) when empty and the sinker position (see FIG. 6) when full. Moreover, when in the floating position (see FIG. 5), the particular configuration of having a larger internal volume adjacent outlet 13 minimises the float from tipping over and promotes the float adopting the upright position illustrated in FIG. 5. Similarly, when the internal volume is filled with sand, there will be a greater weight of sand in the larger internal volume area (21) which will facilitate the body adopting the position illustrated in FIG. 6.

Figure 3:
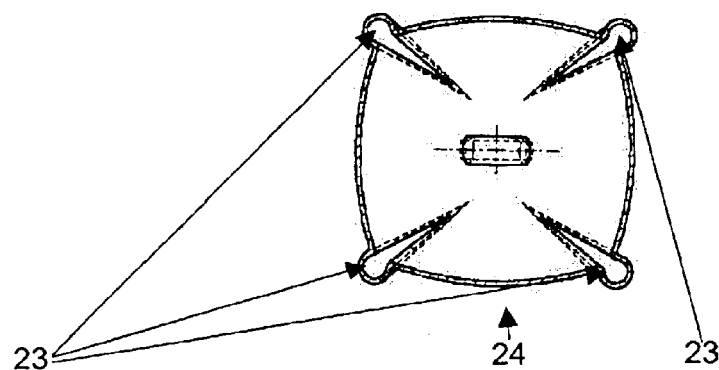
FIG. 3. Illustrates a section view A—A of the accessory.

Referring particularly to FIG. 3, body 11 is provided with 4 longitudinal ribs 23 which extend along the length of the body from eyelet 17 to immediately behind inlets 13. Each rib has a width of about 3 mm and a depth of about 2 mm and is hollow. The ribs can contain a fish attractant. Cap 14 can close or partially close and open end in each rib to seal the attractant or at least partially sealed the attractant in place. A number of openings (not illustrated) may be provided along the length of each rib to allow the fish attractant to slowly pass into the surrounding water. These opening(s)

may be provided with a valve or valves to regulate the flow of fish attractant. The walls 24 of body 11 may bubble outwards but not protrude past ribs 23 ,and along with the ribs, this would add volume and strength to the body without compromising the non rolling design of the accessory. The ribs 23 may include holes or other means to be able to fix drag reducing devices, stabilizing fins, hooks and the like. The ribs 23 while being described as part of body 11 may also be separate from body 11 and attached thereto.

Thus, it can be seen that the accessory can very easily be converted from a float to a sinker or vice versa and can adopt virtually any desirable buoyancy.

What is claimed is:

1. A fishing line accessory that can function as a float and as a sinker, the fishing line accessory comprising:
    a body, which has at least one hollow compartment, the body being buoyant when the hollow compartment is empty,
    the body having a substantially rectangular cross-section to define four exterior corner areas, a rib being provided on at least one corner and extending therefrom and extending along the body,
    an outlet communicating with the at least one hollow compartment and the exterior of the body,
    a closure which closes the outlet but which can adopt an open position,
    the compartment and outlet allowing a solid or liquid to be added to, or removed from the compartment to adjust the buoyancy of the body,
    the compartment able to be substantially completely filled with the solid or liquid,
    the compartment having a larger internal volume adjacent the outlet and a smaller internal volume spaced from the outlet, such that the accessory can adopt a floating position where the accessory is above the fishing line, and a sinker position where the accessory is inverted, and
    attachment means attached to the exterior of the body to allow the accessory to be attached to a fishing line.

2. The accessory as claimed in claim 1, wherein the closure is a threaded cap.

3. The accessory as claimed in claim 1, wherein the body has a single compartment.

4. The accessory as claimed in claim 1, wherein the body has a length of between 20–200 mm.

5. The accessory as claimed in claim 1, wherein the attachment means comprises an eyelet.

6. The accessory as claimed in claim 1, wherein the body is elongate having a first end containing the outlet, and a second opposed end containing the attachment means, the smaller internal volume being adjacent the attachment means.

7. The accessory as claimed in claim 1, containing a single internal hollow compartment which tapers from the larger internal volume to the smaller internal volume.

8. The accessory as claimed in claim 1, wherein the rib is hollow and is adapted to accommodate a fish attractant.

9. The accessory as claimed in claim 1 comprising a plurality of ribs.

10. The accessory of claim 1, wherein a said rib is on each corner, the body having a wall portion extending between two adjacent ribs, the wall portion being curved outwardly.

* * * * *